(12) United States Patent
Levisse et al.

(10) Patent No.: US 12,497,901 B2
(45) Date of Patent: Dec. 16, 2025

(54) VARIABLE PITCH FAN

(71) Applicant: Safran Aircraft Engines, Paris (FR)

(72) Inventors: Paul Ghislain Albert Levisse, Moissy-Cramayel (FR); Olivier Belmonte, Moissy-cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 18/272,390

(22) PCT Filed: Jan. 17, 2022

(86) PCT No.: PCT/FR2022/050091
§ 371 (c)(1),
(2) Date: Jul. 14, 2023

(87) PCT Pub. No.: WO2022/153018
PCT Pub. Date: Jul. 21, 2022

(65) Prior Publication Data
US 2024/0318565 A1 Sep. 26, 2024

(30) Foreign Application Priority Data
Jan. 18, 2021 (FR) ...................................... 2100444

(51) Int. Cl.
*F01D 7/00* (2006.01)
*F01D 25/16* (2006.01)
(Continued)

(52) U.S. Cl.
CPC ............. *F01D 7/00* (2013.01); *F01D 25/162* (2013.01); *B64C 11/38* (2013.01); *B64C 11/385* (2013.01);
(Continued)

(58) Field of Classification Search
CPC ......... B64C 11/38; B64C 11/385; F01D 7/00; F04D 29/323; F04D 29/362; F04D 29/36;
(Continued)

(56) References Cited

U.S. PATENT DOCUMENTS 3,873,236 A * 3/1975 Gall ......................... F01D 7/00
416/162
4,718,823 A 1/1988 Dennison
(Continued)

FOREIGN PATENT DOCUMENTS

FR 3036141 A1 11/2016
FR 3046407 A1 7/2017

OTHER PUBLICATIONS

FR 3046407—Translation (Year: 2017).*
(Continued)

*Primary Examiner* — Courtney D Heinle
*Assistant Examiner* — Behnoush Haghighian
(74) *Attorney, Agent, or Firm* — Kilpatrick Townsend & Stockton LLP

(57) ABSTRACT

The invention relates to a device comprising a fixed actuator for a control system for the orientation of fan blades of a turbomachine, comprising: at least one actuator body housed inside an annular casing of the turbomachine forming a bearing support, the annular casing being centred on a longitudinal axis of the turbomachine an inclined relative thereto, the actuator body having an internal volume in which a piston is able to slide, separating the internal volume into two chambers isolated from one another; and a plurality of actuator rods passing through the annular casing forming a bearing support and each having one end fixed to the piston and an opposite end intended to be connected to an internal ring of a movement transfer bearing in order to drive it in translation, the internal volume of the actuator body being (Continued)

closed downstream by a chamber bottom which forms a single part with the annular casing forming a bearing support.

11 Claims, 4 Drawing Sheets

(51) Int. Cl.
 *B64C 11/38* (2006.01)
 *F04D 29/32* (2006.01)
 *F04D 29/36* (2006.01)

(52) U.S. Cl.
 CPC .......... *F04D 29/323* (2013.01); *F04D 29/362* (2013.01); *F05D 2220/36* (2013.01); *F05D 2240/50* (2013.01); *F05D 2260/79* (2013.01)

(58) Field of Classification Search
 CPC .... F04D 15/0055; F03D 7/022; F03D 7/0224; F05D 2260/74; F05D 2260/76; F15B 15/1428; F15B 15/1433; F15B 15/1438
 See application file for complete search history.

(56) References Cited

U.S. PATENT DOCUMENTS

| | | | | |
|---|---|---|---|---|
| 4,863,347 | A * | 9/1989 | Trott | B64C 11/38 416/49 |
| 9,447,750 | B2 * | 9/2016 | Edwards | F02K 3/072 |
| 10,408,069 | B2 * | 9/2019 | Belmonte | F01D 7/00 |
| 10,689,094 | B2 * | 6/2020 | Patsouris | B64C 11/385 |
| 10,730,608 | B2 * | 8/2020 | Belmonte | B64C 11/06 |
| 10,907,486 | B2 * | 2/2021 | Bordoni | F01D 7/00 |
| 11,104,416 | B2 * | 8/2021 | Yvon | F04D 29/323 |
| 2012/0294717 | A1 * | 11/2012 | Edwards | F02K 3/072 416/147 |
| 2016/0333709 | A1 * | 11/2016 | Belmonte | F01D 7/00 |
| 2018/0334915 | A1 * | 11/2018 | Bordoni | B64C 11/385 |

OTHER PUBLICATIONS

International Patent Application No. PCT/FR2022/050091, International Search Report (and English translation) and Written Opinion, dated May 3, 2022.

* cited by examiner

VARIABLE PITCH FAN

CROSS REFERENCE TO RELATED APPLICATIONS

This application is related to and claims priority benefits of France Patent Application No. 2100444 ("the '444 application"), filed on Jan. 18, 2021. The '444 application is hereby incorporated in its entirety by this reference.

TECHNICAL FIELD

The present invention relates to the general field of turbomachines equipped with one or two ducted or unducted fan(s), and more particularly to the actuator cylinder chamber enabling the controlled setting of the pitch of the fan blade(s) of these turbomachines.

The present invention aims to make a pitch control device with an attached actuator cylinder which optimises the integration of the actuator cylinder chamber.

PRIOR ART

Pitch control systems are known which allow setting the orientation of the blades that form the propellers of turbojet engines in order to set the thrust provided depending on the environment thanks to an actuator cylinder device.

The patent application FR3046407 describes an annular actuator of a pith control system whose body consists of the bearing support, and on which the chamber bottom is attached. Sealing should be ensured by several attached parts (cover, dog clutches . . . ). In case of deformation of the bearing support, for example when it is subjected to a strong imbalance of the fan, the piston may jam in the actuator cylinder body.

The U.S. Pat. No. 4,718,823 describes an actuator cylinder device having an actuator cylinder body with an attached chamber bottom, all attached on the bearing support, which multiplies the mounting operations. In addition, this document does not describe the supply system of the actuator cylinder chamber.

DISCLOSURE OF THE INVENTION

The invention aims to overcome at least some of the aforementioned drawbacks and to provide an actuator cylinder device system having an attached actuator cylinder body, allowing for a simple mounting, which ensures that the actuator cylinder is not jammed in its chamber and which allows for a good sealing between the chamber and the piston.

In view of the foregoing, an object of the invention is a device with a fixed actuator for a system for controlling the orientation of the fan blades of a turbomachine, comprising: at least one actuator body accommodated inside an annular casing of the turbomachine forming a bearing support, said annular casing being centred on a longitudinal axis of the turbomachine and inclined with respect to the latter, each actuator cylinder body comprising an inner volume in which a piston is able to slide, separating the inner volume into two chambers isolated from each other; and a plurality of actuator cylinder rods passing through the annular casing forming a bearing support and each having one end fastened to the piston and an opposite end intended to be connected to an inner ring of a movement transfer bearing to drive it in translation, said inner volume of the actuator cylinder body being closed downstream by a chamber bottom which forms one-piece with the annular casing forming a bearing support.

Preferably, the inner volume of the actuator cylinder body is closed upstream by a wall provided with a plurality of holes through which the actuator cylinder rods pass.

For example, the actuator cylinder body is secured to the annular casing forming a bearing support by a circular flange surrounding the actuator cylinder body.

Advantageously, the circular flange is screwed onto the annular casing.

Preferably, the device includes slots distributed over the internal contour of the chamber bottom.

Preferably, the device includes an annular oil circuit centred on the longitudinal axis and surrounding the plurality of actuator cylinder rods and including a through passage forming an oil inlet passing through the annular casing towards the actuator cylinder body.

Advantageously, the annular oil circuit includes a double circulation of oil through two substantially concentric annular channels.

The device may include several actuator cylinder bodies in each of which a piston is accommodated and said actuator cylinder bodies are evenly distributed around the longitudinal axis of the turbomachine and each piston being connected by one end of an actuator cylinder rod to a synchronisation ring.

According to one embodiment, the invention relates to a system for controlling the orientation of the fan blades of a turbomachine including at least one set of fan blades with adjustable orientation, said set being secured in rotation with a rotary ring, the fan blades being coupled, for the adjustment of their orientation, to a movement transfer bearing intended to make pivots of the fan blades pivot about their radial axis, said movement transfer bearing comprising an inner ring connected to a device as defined before.

The invention also relates to a method for mounting the device comprising, starting from a propeller shaft mounted beforehand on a main casing of the turbomachine via a rolling bearing, assembling each actuator cylinder formed of the actuator cylinder rods and the piston mounted on the actuator cylinder body, said assembly being performed by accommodating each actuator cylinder one after another inside the casing forming a bearing support, and the assembly of this set on the main casing of the turbomachine and the propeller shaft.

BRIEF DESCRIPTION OF THE DRAWINGS

The invention will be better understood from the detailed study of some embodiments considered as non-limiting examples and illustrated by the appended drawings, wherein.

DETAILED DESCRIPTION

The invention applies to any turbomachine equipped with at least one ducted or unducted fan, and whose propeller blades (in the case of an unducted fan) or the fan blades (in the case of a ducted fan) are equipped with a pitch change system. In particular, the invention applies to turboprop engines with one or more propulsion propeller(s), as well as to turbojet engines with propeller(s) (called "Open Rotor") which comprise a propeller (and a variable-pitch stator for the USF—"Unducted Single Fan") or two counter-rotating propellers placed upstream ("puller" version) or downstream ("pusher" version) of the gas generator.

The invention also applies to turbomachines with a ducted fan.

The architecture of these types of turbomachines is well known to a person skilled in the art and will therefore not be described herein in detail. To sum up, these turbomachines include one or more propeller(s) (in the case of a turbomachine with an unducted fan) or a fan (in the case of a turbomachine with a ducted fan) each consisting of a set of fan blades (or vanes) with a variable pitch angle, i.e. their orientation can be modified by means of a system for controlling the orientation of the blades described hereinafter.

Figure 1:
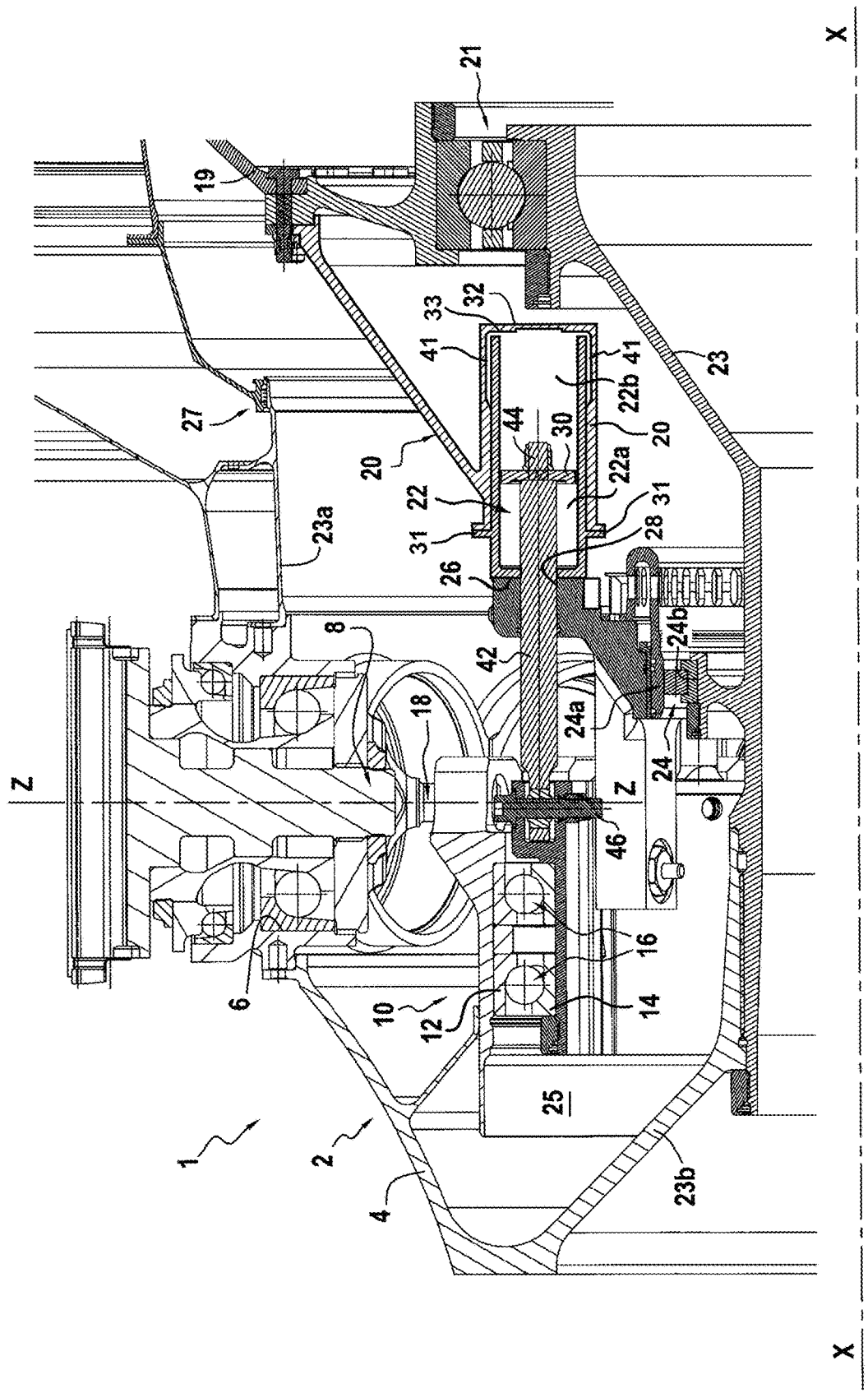
FIG. 1 is a sectional view of a fixed actuator cylinder device according to the invention in its environment.

FIG. 1 partially represents a device 1 including an example of a system 2 for controlling the orientation of the blades of a propeller of a turbomachine with an unducted fan according to the invention.

Of course, in the case of a turbomachine with a ducted fan, the principle of the invention described hereinafter applies in the same manner for the fan blades.

This control system 2 comprises a rotary ring 4 (or hub) centred on the longitudinal axis X-X of the turbomachine and provided with orifices 6 throughout which the pivots 8 of the fan blades are mounted (not represented in the figures).

Each pivot 8 is coupled, for setting the orientation of the corresponding blade, to a movement transfer bearing 10 (also called LTB standing for "Load Transfer Bearing") intended to make said pivot pivot about its radial axis Z-Z.

To this end, the movement transfer bearing 10 comprises an outer ring 12 and an inner ring 14, these rings 12, 14 being centred on the longitudinal axis X-X of the turbomachine, movable in translation along this axis X-X, and defining raceways for bearings (herein two rows of angular contact balls 16 to transmit axial forces in both directions).

The outer ring 12 of the movement transfer bearing is coupled, directly or indirectly, to an inner radial end of the pivots, for example by means of lever arms 18.

When the inner ring of the movement transfer bearing moves axially under the actuation of an actuator cylinder device. It makes the lever arms and thus the pivots 8 pivot in the orifices 6 of the rotary ring about their radial axis Z-Z, thereby causing a pivoting of the fan blades.

Downstream of the actuator cylinder device, the turbomachine also comprises a main casing 19 carrying a ball bearing 21 intended to support in rotation the propeller shaft 23 which supports the rotary ring 4.

Preferably, this propeller shaft 23 is driven by a turbine and a reducer (not represented in the figures).

On this main casing 19, an annular casing 20 is fastened centred on the longitudinal axis X-X of the turbomachine and inclined with respect to the latter by an angle generally larger than thirty degrees (this inclination being oriented so as to confer on the casing 20 a shape like a cone open downstream).

Typically, this casing 20 serves as a support for a rolling bearing 24 intended to guide the rotary ring 4 in rotation.

To this end, the casing 20 carries the outer ring 24a of the rolling bearing 24 (whose 35 inner ring 24b is secured to the rotary ring 4).

In addition, the casing 20 and the rotary ring 4 delimit therebetween an oil compartment 25 containing the actuator cylinder device 1.

This oil compartment 25 is pressurised under vacuum so that the oil does not escape.

To limit the leakage flow rates out of the compartment, provision is made in particular to dispose a sealing gasket 27 downstream of the pivots of the fan blades, between a shroud 23a of the propeller and the main casing 19.

Leakages are possible at the orifices 6 of the rotary ring 4 in which the pivots of the fan blades are mounted.

Nonetheless, these leakages are compensated by the seals of the oil compartment.

Moreover, this oil compartment 25 extends downstream of the rolling bearing 21 and may 10 contain a reducer and seals between the different shafts.

According to the invention, the actuator cylinder device 1 intended to ensure a pivoting of the fan blades comprises in particular an annular actuator cylinder body 22 which is centred on the longitudinal axis X-X of the turbomachine and which is accommodated inside the space delimited by the casing 20 forming a bearing support.

Figure 3:
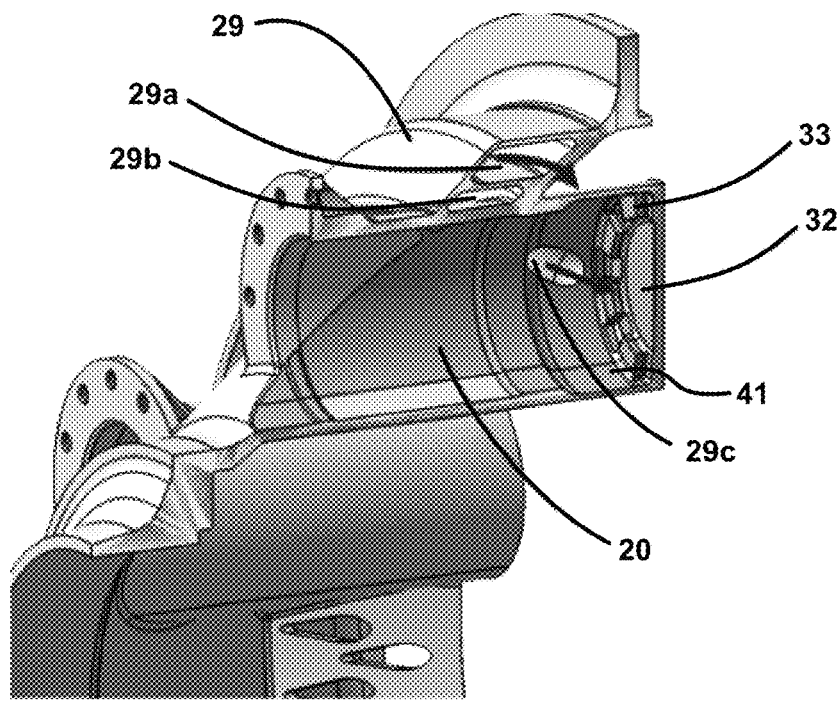
FIG. 3 is a sectional view of the actuator cylinder chamber formed in the housing.

As illustrated in FIG. 3, the actuator cylinder body 22 is a part attached on the casing 20, unlike the actuator cylinder bodies of the prior art which form one-piece with the casing 20.

The actuator cylinder body 22 delimits an inner volume inside which a piston 30 is able to slide separating the inner volume of the actuator cylinder body into two chambers isolated from each other, namely an upstream chamber 22a and a downstream chamber 22b.

It is possible to provide for a plurality of pistons which are independent or each linked by their rod to a synchronisation ring.

This synchronisation ring serves as a synchroniser for the pistons 30 by being able to slide inside the inner volume of the actuator cylinder body 22 under the effect of a hydraulic fluid (not represented) injected under pressure into either one of the upstream and downstream chambers.

Figure 4:
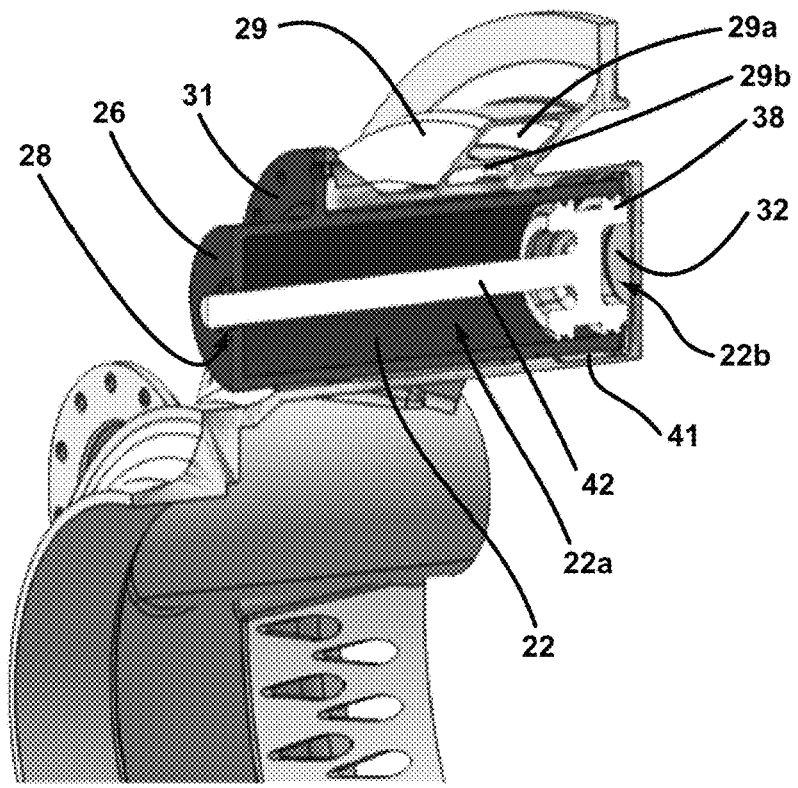
FIG. 4 is a first sectional view of the actuator cylinder chamber in which the actuator cylinder body receiving the actuator cylinder is accommodated.

As illustrated in FIG. 4, the inner volume of the actuator cylinder body 22 is closed upstream by a wall 26 provided with a plurality of holes 28 through which the actuator cylinder rods 42 pass. The holes 28 are distributed around the longitudinal axis X-X of the turbomachine.

Furthermore, the inner volume of the actuator cylinder body 22 is closed downstream by a chamber bottom 32 which, unlike the chamber bottoms of known devices, forms one-piece with the annular casing 20 forming a bearing support.

Making the bottom of the chamber 32 entirely in the material of the annular casing 20 allows overcoming the difficulties of the addition of a closure attached on the casing 20 directly opposite the piston. In particular, an attached chamber bottom generates sealing difficulties and premature wear, while its integration into the casing increases its mechanical resistance to high hydraulic pressure stresses in the chambers 22a, 22b.

Furthermore, an attached chamber bottom requires particular arrangement for sealing the inner volume of the actuator cylinder body, for example at its inner periphery, so as to ensure sealing of the inner volume of the actuator cylinder body in which a significant oil pressure prevails.

The actuator cylinder body 22 may be secured to the annular casing 20 forming a bearing support by a circular flange 31 capping the actuator cylinder body 22.

The circular flange 31 is screwed onto the annular casing 20, for example by a series of holes distributed circularly around the longitudinal axis X-X of the turbomachine, at an outer periphery of the flange 31, and through which screws (not represented in the figures) pass up to threads disposed opposite one another on the casing.

Figure 2:
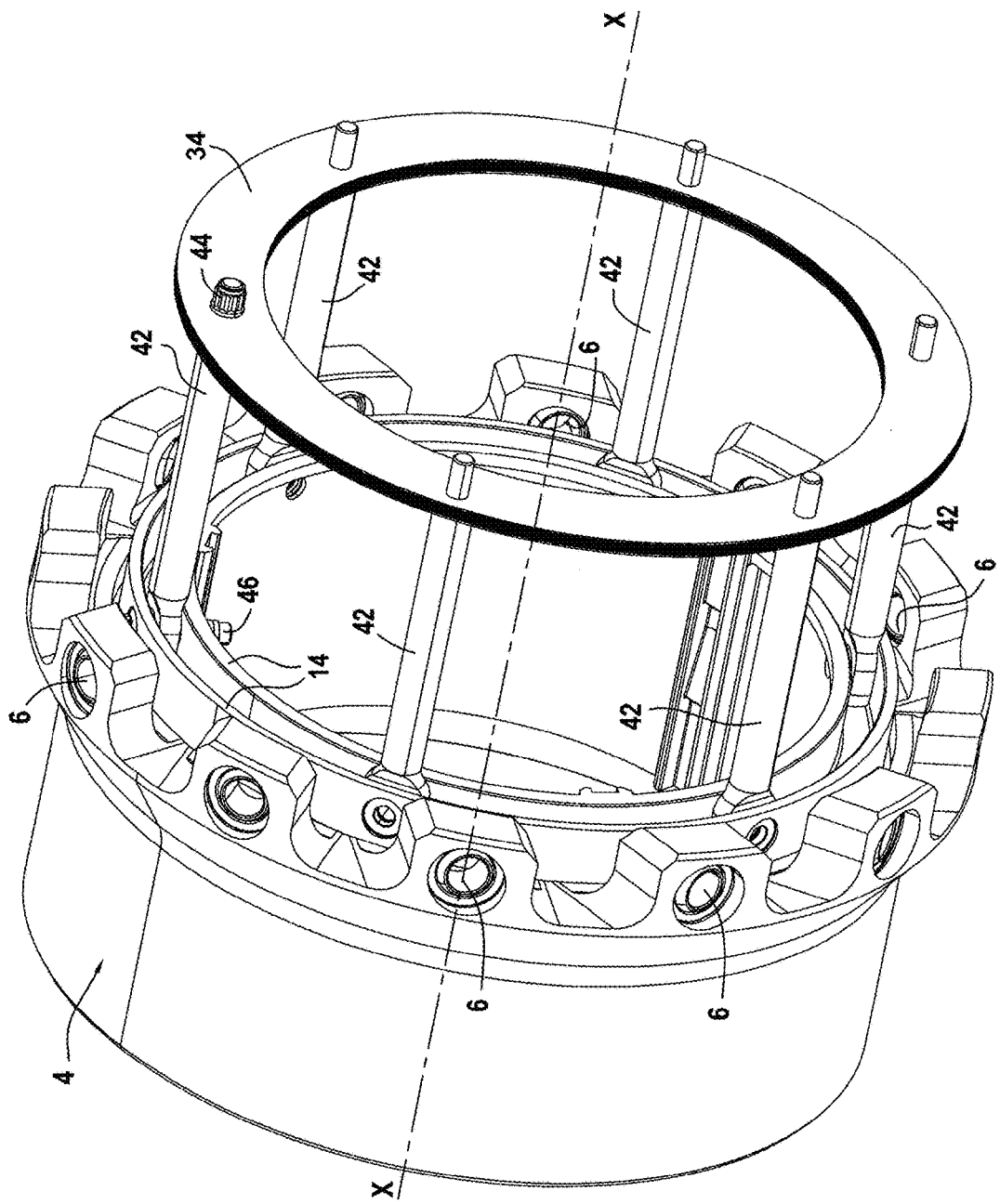
FIG. 2 is a perspective and partial view of the device of FIG. 1.

As also represented in FIG. 2, the actuator cylinder device 1 according to the invention also comprises a plurality of actuator cylinder rods 42 which are mounted throughout the holes 28 of the wall 26 of the actuator cylinder body.

Preferably, these actuator cylinder rods are evenly distributed around the longitudinal axis X-X of the turbomachine to impart the needed pitch control force.

The number of actuator cylinder rods is a trade-off between the force to be transmitted through each rod directly affecting the section of each rod and the number of rods affecting the weight of the system.

Preferably there are at least 4 rods to distribute the forces on the piston.

Each actuator cylinder rod 42 has a downstream end which is fastened to a piston 30 which may be linked to a synchronisation ring 34 of the actuator cylinder body by an actuator cylinder rod 42 and an upstream end which is connected to the inner ring 14 of the movement transfer bearing 10 to drive it in translation.

Fastening the actuator cylinder rods on each piston 30 may be done by means of nuts 44 which are tightened on the downstream end of the rods, these being tapped.

Similarly, at their upstream end, the actuator cylinder rods 42 are connected to the inner ring 14 of the movement transfer bearing by means of screws 46 extending according to a radial direction (FIG. 1).

The synchronisation ring function may be performed either by the inner ring 14 in the case of a plurality of actuator cylinder bodies 22 (FIGS. 3, 4 and 5) or by a synchronisation ring distinct of the inner ring 14 and formed by the single piston 30 in the case of a single actuator cylinder with an annular shape (FIG. 2).

Figure 5:
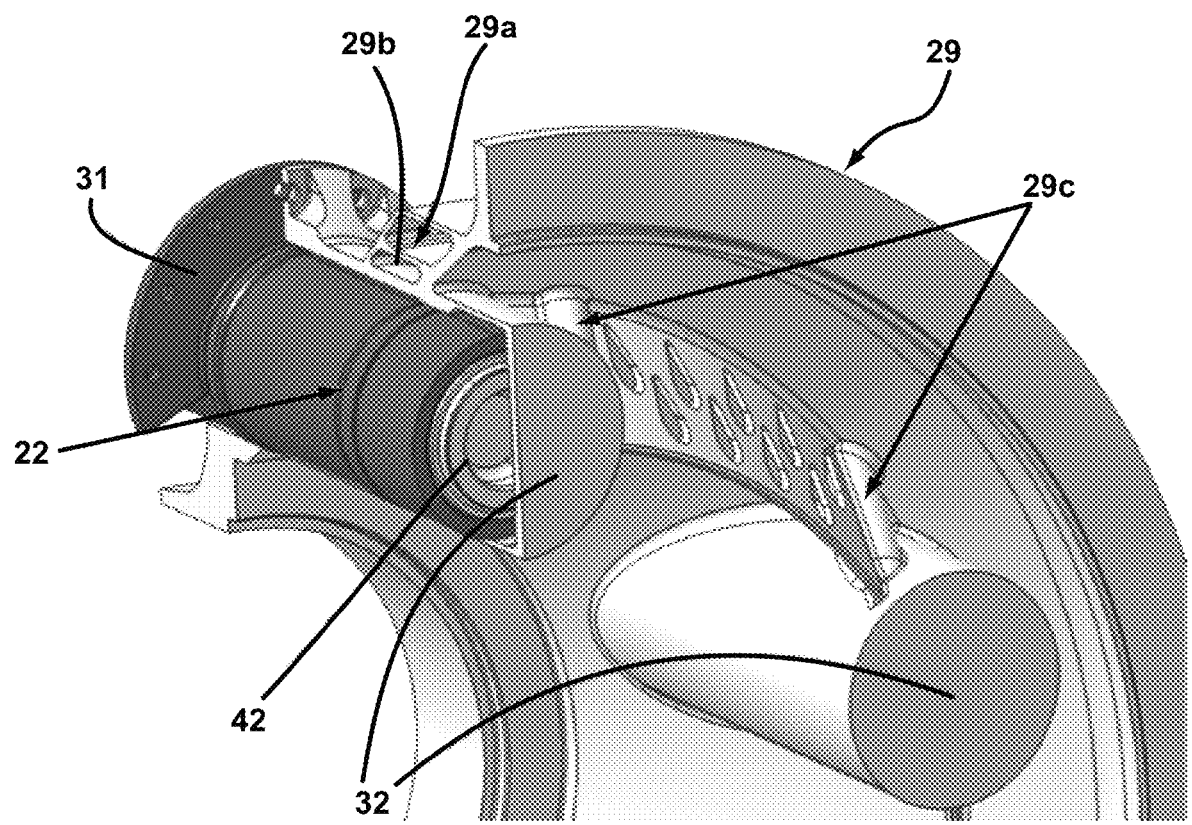
FIG. 5 is a second sectional view of the actuator cylinder chamber in which the actuator cylinder body receiving the actuator cylinder is accommodated.

As illustrated in FIGS. 4 and 5, the device 1 includes an annular oil circuit 29 centred on the longitudinal axis X-X and surrounding the plurality of actuator cylinder rods 42.

The use of several actuator cylinders 42 allows ensuring the redundancy of their function.

Moreover, the maintenance of the actuator cylinder is also facilitated: the latter is no longer buried under the fan hub, but is now easily accessible on the bearing support. In addition, it is possible to replace the actuator cylinders individually in case of maintenance.

The oil circulation in the oil circuit 29 is supplied from the oil compartment 25 and opens into the actuator cylinder body 22 thanks to a through passage 29c forming an oil inlet passing through the annular casing 20 towards the actuator cylinder body 22.

The through passage 29c is transverse to the radial axis of the device 1 and directed towards the chamber bottom 32.

The casing 20 comprises an annular widening 41 of the passage 29c up to the chamber bottom 32, which enables the oil to flow towards the chamber bottom 32.

The chamber bottom 32 returns the oil towards the piston 30. Thus, each chamber bottom 32 associated with an actuator cylinder enables the supply of this actuator cylinder with oil.

As illustrated, the annular widening 41 may form a space with a substantially rectangular section according to the sectional plane of FIG. 1, located between the casing 20 and the actuator cylinder body 22.

Furthermore, the chamber bottom 32 may include slots 33, distributed over the internal contour of the chamber bottom 32 (FIG. 3).

The slots 33 delimit recesses enabling the oil coming from the opening 29c and from the widening 41 to get into the downstream chamber 22b, between the piston 42 and the chamber bottom 32, in particular when the piston 42 is against the slots 33.

The slots 33 further allow ensuring that the chamber bottom 32 is not obstructed, a foreign body or fouling could fit between the slots and not above, so that the stroke of the actuator cylinder 42 is not obstructed.

The annular oil circuit 29 may include a double circulation of oil through two substantially concentric annular channels 29a, 29b.

In particular, it is possible to use two complementary oil circuits 29a, 29b each supplying half of the actuator cylinders 42, to ensure the resistance of the system to the failure of one of the two oil systems.

For example, the two annular channels 29a, 29b are superimposed, for optimising the compactness of the device 1. Each may also have a section with a substantially trapezoidal, in particular rectangular, shape.

The two annular channels 29a, 29b are respectively, for that one radially closest to the X-X axis and for the furthest one, intended to achieve the circulation of oil between the various actuator cylinders 24, and to supply the chamber bottom 32 with oil via the bearing support.

In this case, the radially closest duct is therefore that one which opens onto the through passage 29c.

The operation of the actuator cylinder device 1 obviously follows from the foregoing.

To proceed with the adjustment of the orientation of the pivots of the fan blades 8, a hydraulic fluid is injected under pressure into either one of the upstream and downstream chambers 22a, 22b of the chamber, which causes a movement of each piston 30, (and of the synchronisation ring if there is one to which all pistons 30 are linked) along the longitudinal axis X-X of the turbomachine. The rods 42 then translate axially in a synchronised manner so as to move the movement transfer bearing upstream or downstream. In turn, this translation of the bearing causes a pivoting of the lever arms 18 resulting in a synchronised pivoting of the fan blades.

Mounting the actuator cylinder device according to the invention is as follows.

In a first step, the propeller shaft 23 is assembled to the reducer and the rolling bearing 21 (and its support) to the main casing 19 of the turbomachine. The actuator cylinder rods 42 and the pistons 30 taken one after another or mounted on the synchronisation ring are then assembled on the actuator cylinder body 22 and the casing 20 forming a bearing support.

Afterwards, the set formed by the actuator cylinder rods 42, the pistons 30 independent or mounted on the synchronisation ring, the actuator cylinder body, the casing forming a bearing support and the rolling bearing 24 may be brought axially from upstream downstream to assemble it on the main casing 19 of the turbomachine and 15 the propeller shaft 23.

The movement transfer bearing 10 is then assembled with the actuator cylinder rods 42.

Afterwards, the downstream casing 23a of the propeller is assembled with the rotary ring 4 and the pivots of the fan blades are mounted on this downstream casing.

The lever arms 18 and the studs of the pivots of the fan blades are added to link the pivots to the 20 movement transfer bearing.

Finally, an upstream propeller casing 23*b* is assembled 23*c* to the propeller shaft 23 via a splined connection and to the rotary ring 4.

Dismounting the actuator cylinder device is performed in the reverse way.

Thus, a device 1 serving as a bearing support is assembled, integrating particularly compact and resistant chamber bottom and oil circulation.

In addition, the bearing support is advantageously designed to enable printing using a 3D printing technology of the "Powder Bed Melting" type ("Laser Bed Melting"). This allows making the part in one-piece and integrating the oil circulation lines 29.

The invention claimed is:

1. A device with a fixed actuator for a system for controlling the orientation of a plurality of fan blades of a turbomachine, comprising:
   an annular casing for the turbomachine and forming a support for a bearing, said annular casing being configured to be centered on a longitudinal axis of the turbomachine and inclined with respect to the latter;
   at least one actuator cylinder body extending at least partially into the annular casing, wherein the at least one actuator cylinder body comprises an inner volume in which a piston is able to slide, separating the inner volume into two chambers isolated from each other; and
   at least one actuator cylinder rod passing through the annular casing body and at least partially into the inner volume, wherein the at least one actuator cylinder rod comprises one end fastened to the piston and an opposite end intended to be connected to an inner ring of a movement transfer bearing to drive the movement transfer bearing in translation, wherein said inner volume of the at least one actuator cylinder body is closed downstream by a chamber bottom of the annular casing and which forms one-piece with the annular casing.

2. The device according to claim 1, wherein at least one actuator cylinder body further comprises a wall opposite the chamber bottom of the annular casing, wherein the wall (i) closes an upstream end of the inner volume of the at least one actuator cylinder body and (ii) comprises at least one hole through which the at least one actuator cylinder rod passes.

3. The device according to claim 1, wherein the at least one actuator cylinder body is secured to the annular casing forming a bearing support by a circular flange surrounding the at least one actuator cylinder body.

4. The device according to claim 3, wherein the circular flange is screwed onto the annular casing.

5. The device according to claim 1, comprising slots distributed over the internal contour of the chamber bottom.

6. The device according to claim 1, including an annular oil circuit centered on the longitudinal axis and surrounding the at least one actuator cylinder rod and including a through passage forming an oil inlet passing through the annular casing towards the at least one actuator cylinder body.

7. The device according to claim 6, wherein the annular oil circuit includes a double circulation of oil through two substantially concentric annular channels.

8. The device according to claim 1, wherein the at least one actuator cylinder body comprises a plurality of actuator cylinder bodies in each of which a piston is accommodated and said plurality of actuator cylinder bodies are evenly distributed around the longitudinal axis of the turbomachine.

9. The system for controlling the orientation of the plurality of fan blades of the turbomachine of claim 1, comprising the device according to claim 1 and at least one set of the plurality of fan blades with adjustable orientation, said set being secured in rotation with a rotary ring, the plurality of fan blades being coupled, for the adjustment of their orientation, to the bearing intended to make pivots of the plurality of fan blades pivot about their radial axis, said bearing comprising an inner ring connected to said device.

10. A method for mounting the device according to claim 1, comprising, starting from a propeller shaft mounted beforehand on a main casing of the turbomachine via a rolling bearing, assembling each actuator cylinder formed of the at least one actuator cylinder rod and the piston mounted on the at least one actuator cylinder body, said assembly being performed by accommodating each actuator cylinder one after another inside the casing forming a bearing support, and the assembly of this set on the main casing of the turbomachine and the propeller shaft.

11. A device with a fixed actuator for a system for controlling the orientation of a plurality of fan blades of a turbomachine, comprising:
   an annular casing for the turbomachine forming a support for a bearing, said annular casing being configured to be centered on a longitudinal axis of the turbomachine and inclined with respect to the latter;
   at least one actuator cylinder body extending at least partially into the annular casing, wherein the at least one actuator cylinder body comprises an inner volume in which a piston is able to slide, separating the inner volume into two chambers isolated from each other, wherein the at least one actuator cylinder body is a part attached to the annular casing such that the at least one actuator cylinder body is separable from the annular casing; and
   at least one actuator cylinder rod passing through the annular casing body and at least partially into the inner volume, wherein the at least one actuator cylinder rod comprises one end fastened to the piston and an opposite end intended to be connected to an inner ring of a movement transfer bearing to drive the movement transfer bearing in translation, wherein said inner volume of the at least one actuator cylinder body is closed downstream by a chamber bottom of the annular casing which forms one-piece with the annular casing.

\* \* \* \* \*